United States Patent [19]
Torii et al.

[11] Patent Number: 5,111,709
[45] Date of Patent: May 12, 1992

[54] INDUSTRIAL ROBOT WITH A TELESCOPIC HORIZONTAL ARM

[75] Inventors: Nobutoshi Torii, Tokyo; Susumu Ito, Yamanashi; Masayuki Hamura, Yamanashi; Akira Tanaka, Yamanashi, all of Japan

[73] Assignee: Fanuc, Ltd., Yamanashi, Japan

[21] Appl. No.: 589,836

[22] Filed: Sep. 26, 1990

[30] Foreign Application Priority Data

Sep. 27, 1989 [JP] Japan .................. 1-249119

[51] Int. Cl.⁵ .................. F16H 27/02; B25J 18/02
[52] U.S. Cl. .................. 74/89.15; 74/424.8 B; 414/749; 901/23; 901/25
[58] Field of Search ........ 74/89.15, 424.8 R, 424.8 B; 901/23, 25; 414/749, 751

[56] References Cited

U.S. PATENT DOCUMENTS

| | | | |
|---|---|---|---|
| 3,493,233 | 2/1970 | Foufounis | 74/89.15 |
| 4,024,959 | 5/1977 | Gruner | 414/751 |
| 4,604,027 | 8/1986 | Becker et al. | 74/89.15 X |
| 4,669,325 | 6/1987 | Nishikawa et al. | 74/89.15 |
| 4,682,930 | 7/1987 | Hachisu | 74/89.15 X |
| 4,693,131 | 9/1987 | Teramachi | 74/424.8 B |
| 4,913,613 | 4/1990 | Hirschmann | 414/751 |

FOREIGN PATENT DOCUMENTS 2519782 11/1976 Fed. Rep. of Germany ........ 901/25
60-123294 1/1985 Japan .

*Primary Examiner*—Allan D. Hermann
*Assistant Examiner*—Julie Krolikowski
*Attorney, Agent, or Firm*—Armstrong, Nikaido, Marmelstein, Kubovcik & Murray

[57] ABSTRACT

An industrial robot with a horizontal telescopic arm unit having an arm casing horizontally slidably mounted on a vertical upright column, a telescopic arm encased in the arm casing to be telescopically moved with respect to the arm casing and in synchronism with the horizontal sliding movement of the arm casing, and a common drive motor causing the horizontal linear sliding movement of the arm casing and the telescopic movement of the telescopic arm via a rotation to linear movement converting mechanism.

7 Claims, 4 Drawing Sheets

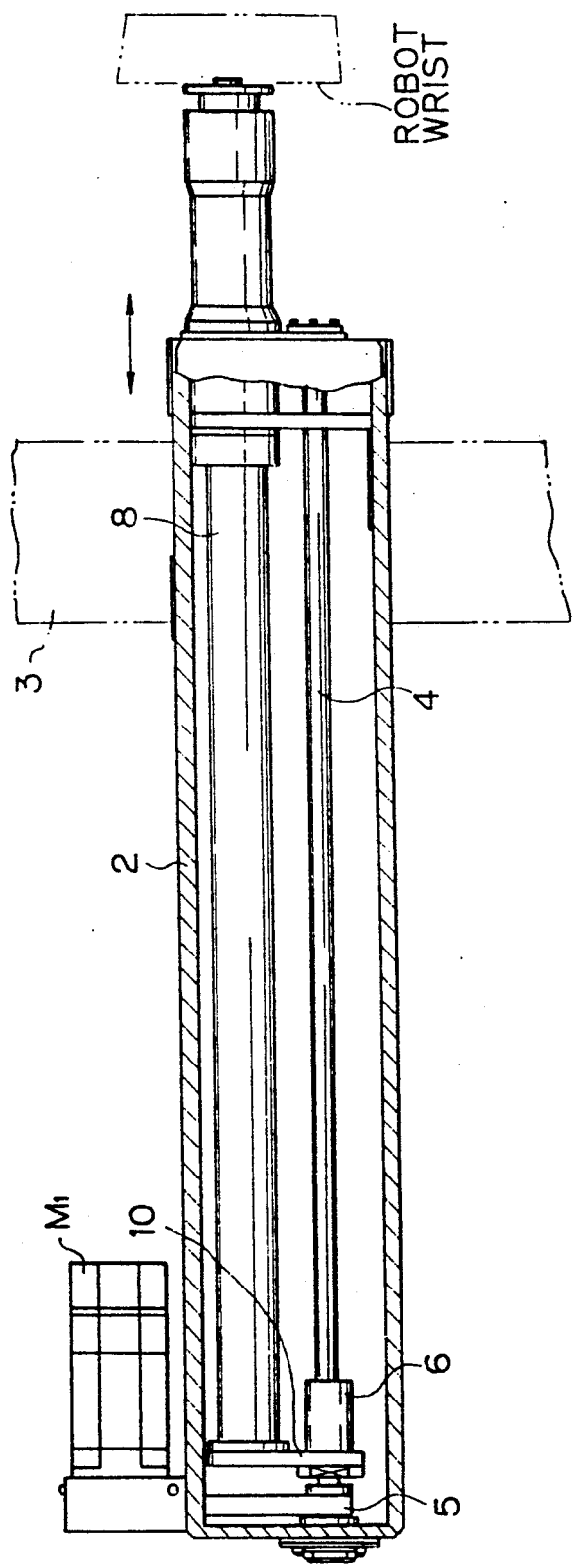

INDUSTRIAL ROBOT WITH A TELESCOPIC HORIZONTAL ARM

BACKGROUND OF THE INVENTION

1. Field of the Invention

The present invention relates to an industrial robot with a telescopic horizontal arm, and more particularly, to a cylindrical coordinate type industrial robot provided with an upright column extending from a lower turnable base and having a vertical axis, and a horizontal arm mounted on the upright column to be telescopically movable in a horizontal axis perpendicular to the vertical axis of the upright column and having an improved drive source for a telescopic movement of the horizontal arm.

2. Description of the Related Art

In various conventional industrial robots, a cylindrical coordinate type industrial robot is provided with a horizontal arm telescopically movable in a horizontal axis. FIG. 5 illustrates a conventional horizontal arm of the cylindrical coordinate type industrial robot. In FIG. 5, the horizontal arm unit is mounted on a vertically intermediate portion of a vertical column 3 via arm casing 2 having one end on which a drive motor $M_1$ is fixedly mounted, and provided with a ball screw shaft 4 arranged to be axially horizontally extended in the arm casing 2 and rotatively driven by the drive motor $M_1$ via a belt-pulley transmission unit 5 employing a timing belt. The horizontal arm is further provided with a ball screw nut 6 which is threadedly engaged with the ball screw shaft 4 to be moved along the axis of the ball screw shaft 4, and is connected, via a connecting member 10, to a telescopic arm 8 arranged to be in parallel with the ball screw shaft 4 and moved together with the ball screw nut 6 in an axial direction corresponding to a horizontal telescopic axis of the horizontal arm unit. Namely when the ball screw shaft 4 is rotatively driven by the drive motor $M_1$, the ball screw nut 6 is linearly axially moved along the axis of the ball screw shaft 4 due to a rotation to linear movement converting action of these threadedly engaged elements. The linear movement of the ball screw nut 6 causes the movement of the telescopic arm 8 via the connecting member 10 in the horizontal telescopic axis of the horizontal arm unit. The telescopic arm 8 has one external end thereof to which a robot wrist member is attached.

Japanese Unexamined (Kokai) Patent Publication No. 60-123294 discloses a different construction of a conventional telescopic horizontal arm provided with two first arms and two second arms, which are moved by the two separate assemblies of ball screw shafts and nuts.

In the former conventional horizontal arm unit of the cylindrical coordinate type industrial robot shown in FIG. 5, the maximum amount of telescopic movement of the telescopic arm 8 from a retracted position wherein the telescopic arm 8 is fully retracted into the arm casing 2 to an extended position wherein the telescopic arm 8 is fully extended from the arm casing 2 is determined only by the length of the telescopic arm 8 per se, as illustrated in FIG. 4. Therefore, when the maximum amount "L" of telescopic movement of the telescopic arm 8 is large, the length of the telescopic arm 8 and the arm casing 2 must be accordingly long, and therefore, the arm housing 2 supported by the upright column 3 must have a long portion extended in a rearward direction, i.e., in a direction opposite to the direction in which the telescopic arm 8 is extended from the retracted position. As a result, when the cylindrical coordinate industrial robot is turned about a vertical axis, the long rearward portion of the arm casing 2 of the horizontal arm unit sweeps over a wide circular area having a radius $R_1$ and designated by hatching lines in FIG. 4. Therefore, the wide circular area of which the radius is "$R_1$" becomes an area which must be always left unoccupied, to enable a free turning of the horizontal arm unit about the vertical axis without obstruction. Thus, when the conventional cylindrical coordinate type industrial robot having a horizontal telescopic arm is located at a site for use in a working area, the wide circular unoccupied area must be allowed around the robot, for a free motion of the robot, and accordingly, an effective use of the working area is prevented.

In the latter conventional industrial robot with a horizontal telescopic arm unit disclosed in Japanese Unexamined Patent Publication No. 60-123294, the first and second assembly of two arms are accommodated in a single boom, to be smoothly horizontally moved by the drive motor and the ball screw and nut assemblies housed in the boom via two bearing units. Therefore, the horizontal telescopic arm unit becomes considerably heavy, and the drive motor for the telescopic arm unit must have a large output power. Further, when the construction of the horizontal arm unit of the Japanese Unexamined Patent Publication No. 60-123294 is adopted as a horizontal arm of a cylindrical coordinate type industrial robot, drive motors for vertical motion of the horizontal arm unit on a vertical column and for a turning motion of the same arm about a vertical axis via a turnable body must bear a heavy load, respectively, during the operation.

SUMMARY OF THE INVENTION

Therefore, an object of the present invention is to provide a cylindrical coordinate type industrial robot provided with a horizontal arm unit including a horizontally telescopically movable arm, and an arm operating unit capable of eliminating the defects encountered by the conventional horizontal arm unit for an industrial robot.

A further object of the present invention is to provide a cylindrical coordinate type industrial robot provided with a horizontal and telescopically movable arm unit whereby, when the robot is located at a site for use in a working area, an unoccupied zone around the body of the industrial robot can be made as small as possible.

In accordance with the present invention, there is provided with an industrial robot including an upright column extending vertically with respect to a robot base portion, and a horizontal arm unit supported by the upright column, and the horizontal arm unit comprises:

an arm casing mounted on a part of the upright column to be horizontally slidably moved relative to the upright column;

a telescopic arm held by the arm casing for retracting inside and extending outward from the inside of the arm casing;

a common drive source mounted externally on the arm casing;

a rotation to linear motion converting means for converting a rotational output given by the drive source to a linear motion input to cause linear movements of the arm casing and the horizontal telescopic arm.

BRIEF DESCRIPTION OF THE DRAWINGS

The above and other objects, features and advantages of the present invention will become more apparent from the ensuring description of a preferred embodiment with reference to the accompanying drawings wherein.

DESCRIPTION OF THE PREFERRED EMBODIMENT

Figure 1:
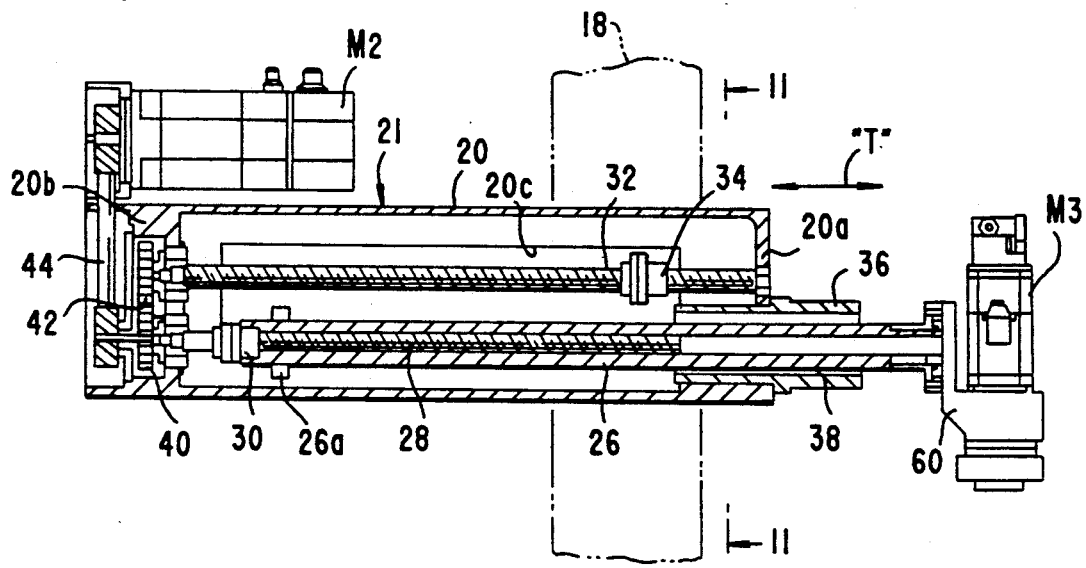
FIG. 1 is a longitudinal cross-sectional view of a horizontally telescopically movable arm unit with an operating unit thereof, to be accommodated in a cylindrical coordinate type industrial robot according to an embodiment of the present invention.
Figure 2:
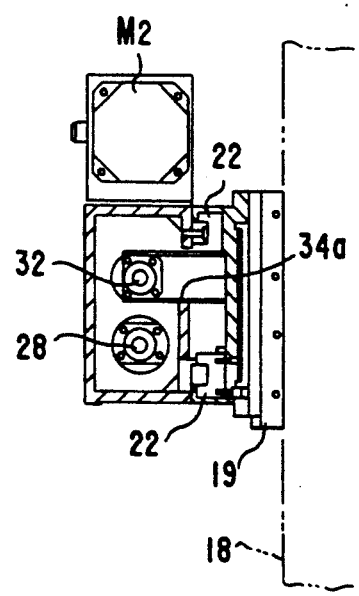
FIG. 2 is a cross-sectional view taken along the line II—II of FIG. 1.
Figure 1A:
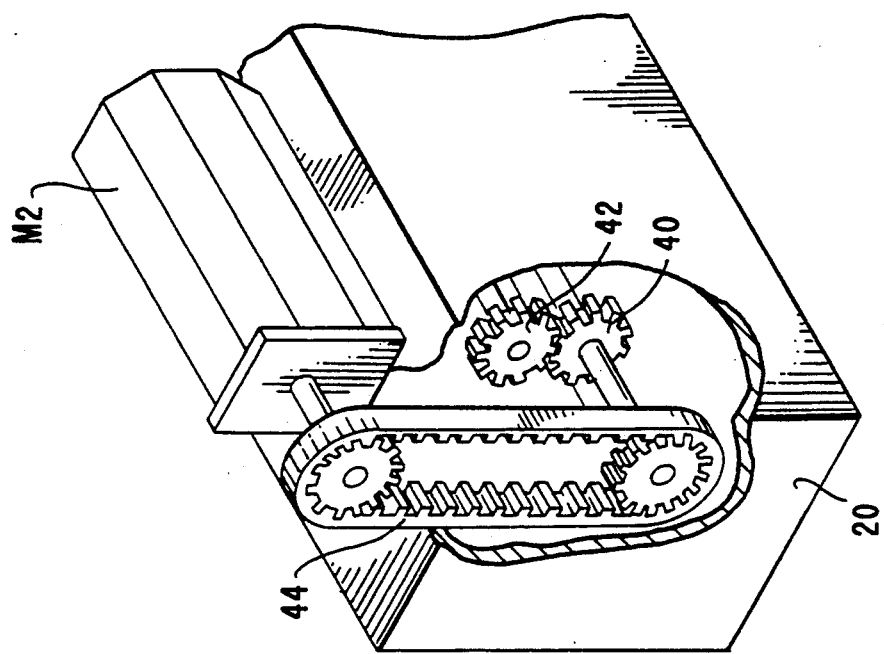
FIG. 1A is a cut-away view of an end of the arm unit showing the drive source and a belt and pulley arrangement for transmitting rotational power therefrom.

Referring to FIGS. 1, 1A and 2, a horizontal arm unit 21 for an industrial robot, particularly a cylindrical coordinate type industrial robot, according to an embodiment of the present invention is mounted on an upright column 18 via a vertical slide 19 vertically slidably attached to one of the sides of the upright column 18 to thereby enable the horizontal arm unit 21 to be moved vertically. The horizontal arm unit 21 is provided with an arm casing 20 which is supported by a conventional linear guide element 22 to be slidable in a horizontal direction "T" in parallel with a longitudinal axis of the horizontal arm unit 21. The horizontal arm unit 21 is further provided with a cylindrical and hollow telescopic arm 26 held by the arm casing 20 to be capable of sliding in the direction "T". Namely, the telescopic arm 26 can be telescopically moved to extend outward from an end 20a of the arm casing 20, and be retracted inside the arm casing 20. A later-described first ball screw 28 and a ball screw nut 30 engaged with the ball screw are provided for causing the telescopic movement of the telescopic arm 26 with respect to the arm casing 20, and the telescopic arm 26 per se has a spline construction formed in the outer surface thereof and slidably fitted in a slide bearing 38 held within a cylindrical bearing box 36 arranged at the end 20a of the arm casing 20. Therefore, a rotation of the telescopic arm 26 can be prevented during the telescopic movement in the horizontal direction "T". The telescopic arm 26 has an outer extreme end thereof to which a robot wrist 60 provided with an end effector (not illustrated in FIGS. 1, 1A and 2) to be used as a working element, such as a robot hand, is removably attached. The robot wrist 60 is provided with a drive motor $M_3$ for driving the robot wrist 60 per se.

The first ball screw 28 of the telescopic arm 26 is arranged to extend through inside the hollow telescopic arm 26, and has one end rotatably supported by a rotary bearing element fitted to an end 20b of the arm casing 20, and the other end rotatably supported by the other rotary bearing element mounted on the outer extreme end of the telescopic arm 26. Namely, the first ball screw 28 is held to be rotatable relative to the telescopic arm 26.

The ball screw nut 30 threadedly engaged with the first ball screw 28 is fixedly attached to an innermost end of the telescopic arm 26, and accordingly, when the ball screw 28 is rotated, the ball screw nut 30 and the telescopic arm 26 are integrally linearly moved with relative to the arm casing 20 due to a rotation to linear motion converting action exhibited by the threaded engagement of the ball screw 28 and the ball screw nut 30. An elastic stop 26a is provided for elastically stopping the linear movement of the telescopic arm 26 in the direction extending from the end 20a of the arm casing 20 when the elastic stop 26a elastically abuts against an inner end of the bearing box 36.

A second ball screw 32 is arranged to be in parallel with the first ball screw 26 within the arm casing 20. The second ball screw 32 is held to be rotatable by the opposite ends 20a and 20b of the arm casing 20 via rotary bearing elements, and is threadedly engaged with a ball screw nut 34 fixed to a supporting bracket 34a attached to the vertical slider 19, and extended into inside the arm casing 20 via a longitudinal aperture 20c formed in the rear of the arm casing 20. Namely, the ball screw nut 34 is a stationary member threadedly engaged with the rotatable ball screw 32 at a fixed position of the vertical slider 19. When the second ball screw 32 is rotated, since the ball screw nut 34 is stationary, the second ball screw 32 is linearly moved relative to the stationary ball screw nut 34, and therefore, the arm casing 20 holding the second ball screw 32 is linearly moved together with the second ball screw 32.

The ends of the first and second ball screws 26 and 32 are extended outward beyond the end 20b of the arm casing 20, and are provided with gear elements 40 and 42, respectively, fixed thereto. The gear elements 40 and 42 are engaged with one another, and one of the gear elements 40 and 42, i.e., the gear element 40 fixed to the end of the first ball screw 28 is connected to a drive motor $M_2$ via a belt pulley mechanism 44 having a toothed belt. Therefore, when the gear element 40 is rotatively driven by the drive motor $M_2$ via the belt pulley mechanism 44, the other gear element 42 is also rotated at a speed determined by the gear ratio between both gear elements 40 and 42, and accordingly, the first and second ball screws 28 and 32 are rotated at respective speeds. Namely, the drive motor $M_2$ is a common drive source for the first and second ball screws 28 and 32. In the illustrated embodiment, the gear ratio between the gear elements 40 and 42 is chosen as 1:1, and therefore, the first and second ball screws 26 and 32 are rotated at the same speed in different directions.

Figure 3:
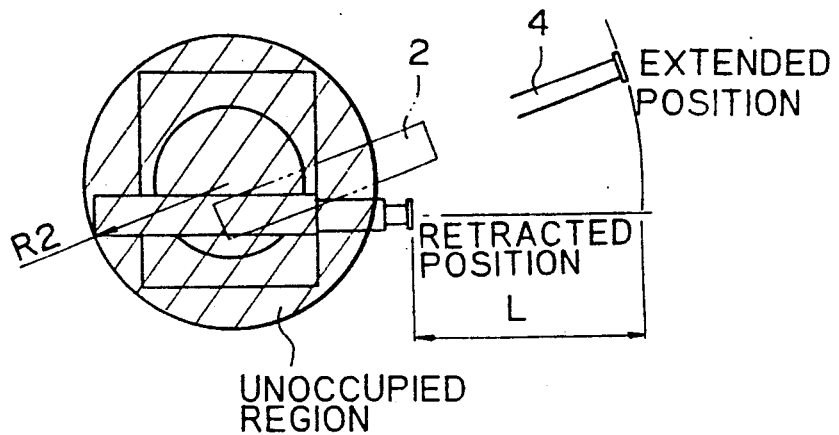
FIG. 3 is a plan view illustrating a small unoccupied zone extending around the robot provided with the horizontally telescopically movable arm unit and the operating unit of FIGS. 1 and 2.
Figure 4:
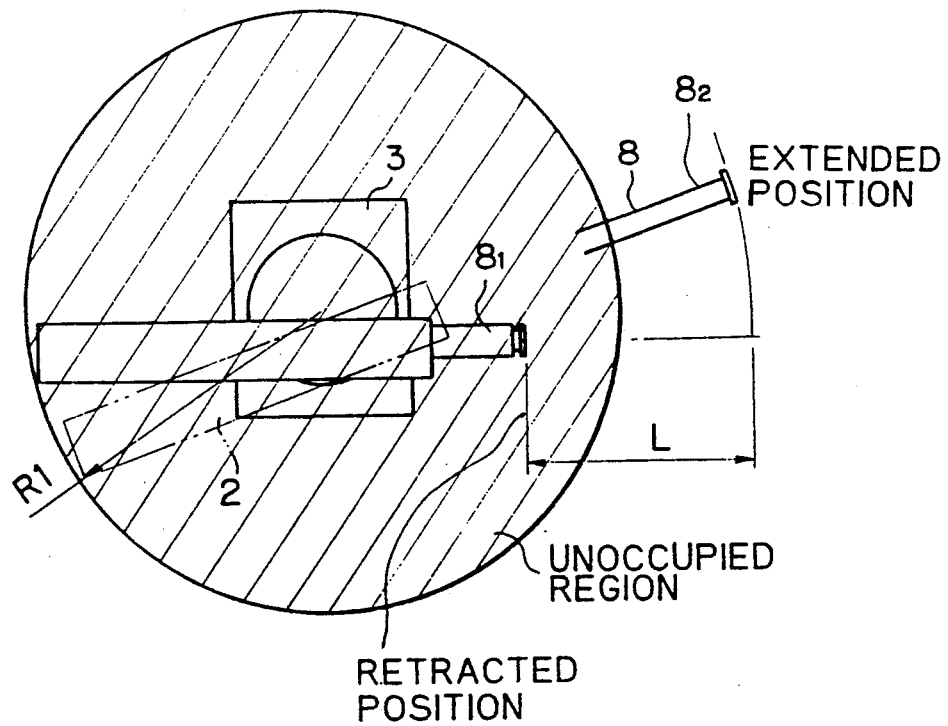
FIG. 4 is a plan view illustrating a large unoccupied zone extending around an industrial robot provided with the horizontally telescopically movable arm unit according to a prior art; and, FIG. 5 is a longitudinal cross-sectional view of a horizontally telescopically movable arm unit with an operating unit thereof, according to a prior art.

When the ball screws 28 and 32 are rotated at the same speed due to the operation of the common drive motor $M_2$, since the ball screw nut 30 is fixedly attached to the linearly movable telescopic arm 26, and since the other ball screw nut 34 is kept stationary with respect to the arm casing 20, the arm casing 20 and the telescopic arm 26 can be linearly moved in synchronism with one another in the same direction coinciding with the direction "T" in FIG. 1, while permitting the telescopic arm 26 to telescopically move with respect to the arm casing 20. Accordingly, the horizontal arm unit 21 is moved horizontally with respect to the upright column 18 due to the operation of the common drive motor M₂, in such a manner that the robot wrist 60 is able to be positioned at a desired position along an axis coinciding with the horizontal axis of the movement of the horizontal arm unit 21. At this stage, it should be understood that, due to the synchronized linear movement of the telescopic arm 26 and the arm casing 20 in the same direction, the arm casing 20 is always charged with one half of the full stroke of linear movement of the horizontal arm unit 21, and the telescopic arm 26 is always charged with the remaining half of the full stroke of linear movement of the arm unit 21. This is quite different from the conventional horizontal arm unit illustrated in FIG. 5 in which only the telescopic arm 8 is charged with a full stroke of the arm unit. Therefore, in the horizontal arm unit 21 of the present embodiment, the entire length of the horizontal arm unit 21 can be made shorter to realize a given amount of a stroke "L" of the linear movement, compared with the conventional horizontal arm unit. As a result, as illustrated in FIG. 3, an unoccupied region for the rotation of the horizontal arm unit 21 about a vertical axis of the cylindrical coordinate type industrial robot can be a circular region having a radius "R₂", which is obviously smaller than the radius "R₁" of the conventional horizontal arm unit as illustrated in FIG. 4. Therefore, when the cylindrical coordinate type industrial robot provided with the horizontal arm unit 21 of the present embodiment is located at a site for use in a working area such as a machining shop, the used and unoccupied region can be made as small as possible, to thus enable a more effective use of the working area.

Furthermore, since the horizontal arm unit 21 can be short in length, and light in weight, when the horizontal arm unit 21 is rotated about a vertical axis of the cylindrical coordinate type industrial robot, an inertial load applied to a drive motor for that rotation can be reduced compared with the conventional arm unit.

From the description of the illustrated embodiment, it will be understood that, since the horizontal arm unit is provided with a single telescopic arm encased and held by an arm casing, the common drive motor M₂ can be a small size and low output power motor.

From the foregoing, it will be understood that, in accordance with the construction of the horizontal arm unit of the present invention, the entire length of the horizontal arm unit for a cylindrical coordinate type industrial robot can be made short compared with the conventional similar type arm unit, to realize a given amount of stroke of a linear movement. Accordingly, an unoccupied region for a rotation of a cylindrical coordinate type industrial robot about a vertical axis can be made smaller, and therefore, an unused region of a working area extending around the cylindrical coordinate type industrial robot can be reduced, thus enabling required equipment and installations to be arranged around the industrial robot. Further, due to the short length of the horizontal arm unit, an inertial load applied to not only a drive motor of the industrial robot for rotating the arm unit about a vertical axis, but also a drive motor mounted on the arm unit per se for driving the linear telescopic movement of the telescopic arm, can be lowered.

Although the description of the preferred embodiment of the present invention is given above, modifications to and variations thereof will occur to a person skilled in the art without departing from the scope and spirit of the present invention. For example, the gear ratio of the gear engagement of the horizontal arm unit may be changed from the described ratio of 1:1 to a different ratio, to provide the telescopic arm and the arm casing with different speeds in the linear movements thereof.

We claim:

1. An industrial robot including an upright column extending vertically with respect to a robot base portion, and a horizontal arm unit supported by the upright column, wherein the horizontal arm unit comprises:

an arm casing mounted on a part of the upright column to be horizontally slidably moved relative to the upright column;

a telescopic arm held by said arm casing for being retracted inside and extended outward from inside said arm casing;

a common drive source mounted externally on said arm casing;

a rotation to linear motion converting means for converting a rotational output given by said common drive source to a linear motion input to cause linear movements of the arm casing and the horizontal telescopic arm.

2. An industrial robot according to claim 1, wherein said rotation to linear motion converting means comprises:

an axial first ball screw rotatably held by said telescopic arm and driven by said common drive source;

a first ball screw nut engaged with said axial first ball screw and fixedly attached to said telescopic arm to thereby cause said linear movement of said telescopic arm upon a rotation of said axial first ball screw;

an axial second ball screw rotatably held by said arm casing and driven by said common drive source; and a second ball screw nut stationarily projecting from a part of said upright column into said arm casing, and engaged with said axial second ball screw to thereby cause said linear movement of said arm casing upon a rotation of said axial second ball screw.

3. An industrial robot according to claim 2, wherein said horizontal arm unit further comprises:

a belt pulley means and first and second gears engaged with one another and fixedly attached to said axial first and second ball screws, respectively, said belt pulley means including a toothed belt engaged with toothed pulleys thereof, said belt pulley means and said first and second gears being arranged at one end of said arm casing wherein said belt pulley means transmits rotative power from said common drive source to said first and second gears, thereby rotating said first and second ball screws.

4. An industrial robot according to claim 3, wherein a gear ratio between said first and second gears is 1:1, thereby rotating said first and second ball screws at the same speed.

5. An industrial robot according to claim 1, wherein said telescopic arm is provided with a spline portion formed in the outer surface thereof, to be thus slidably but non-rotatably fitted in a linear guide element arranged at an end of said arm casing.

6. An industrial robot according to claim 5, wherein said telescopic arm is provided with an elastic stop fixedly mounted thereon, said elastic stop being capable of abutting against an end of said linear guide element to elastically stop said linear movement of said telescopic arm.

7. An industrial robot according to claim 1, wherein said telescopic arm has an outer extreme end to which a robot wrist element is attached.

* * * * *